United States Patent [19]

Suehisa et al.

[11] Patent Number: 4,545,685
[45] Date of Patent: Oct. 8, 1985

[54] MIXING DEVICE

[75] Inventors: Shiro Suehisa, Osaka; Hideki Kajiwara, Yawata, both of Japan

[73] Assignee: Joto Chemical Company, Ltd., Osaka, Japan

[21] Appl. No.: 618,742

[22] Filed: Jun. 8, 1984

[30] Foreign Application Priority Data

Feb. 15, 1984 [JP] Japan .................................. 59-25164

[51] Int. Cl.⁴ ............................................. B01F 15/06
[52] U.S. Cl. ..................................... 366/144; 366/69; 366/176; 366/184; 366/293
[58] Field of Search .................... 366/69, 71, 72, 293, 366/294, 315, 316, 317, 176, 97, 98, 99, 144, 145, 146, 147, 149, 184; 51/407

[56] References Cited

U.S. PATENT DOCUMENTS

| 1,269,399 | 6/1918 | Davis | 366/316 |
| 2,009,957 | 7/1935 | Esch | 366/317 |
| 2,260,834 | 10/1941 | Everett | 366/317 |
| 2,734,728 | 2/1956 | Myers | 366/316 |

Primary Examiner—Robert W. Jenkins
Attorney, Agent, or Firm—Stephen F. K. Yee

[57] ABSTRACT

A device for mixing, milling or kneading feed materials, such as plastics and fillers, including a pair of plate members, preferably upper and lower discs, each having a non-flat operating surface and being adapted so that, by movement, preferably rotation, of one or both, a relative motion between the two operating surfaces may be maintained, and grooves provided in both of the operating surfaces and arranged so that the grooves of one operating surface may cross the grooves of the other operating surface upon the relative motion between the two operating surfaces.

12 Claims, 19 Drawing Figures

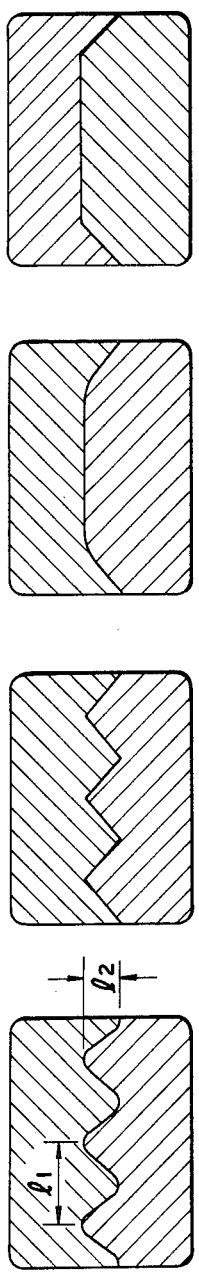

MIXING DEVICE

BACKGROUND OF THE INVENTION

This invention relates generally to a mixing device. More specifically, the present invention is concerned with a disc-type mixing device useful for mixing, milling or kneading solids such as plastic materials.

There are known methods in which waste plastic materials are mixed with powdery fillers such as sludge and wood powder for the production of construction materials. The step of mixing or milling the plastic materials and fillers is generally effected by means of a Bambury's mixer or a biaxial extruder. Such known devices, however, suffer from a drawback that homogeneous dispersion cannot be accomplished even if the mixing step is conducted for a long period of time. In addition, with a mixing device of an extruder type, it is impossible to conduct the mixing at a suitably elevated temperature and, hence, the ratio of the amount of the filler to the amount of the plastic material cannot be increased to a desirable degree.

SUMMARY OF THE INVENTION

It is, therefore, an object of the present invention to provide a mixing device which is devoid of the drawbacks involved in the conventional mixing device.

Another object of the present invention is to provide a simple and compact device with which the mixing, milling, grinding or kneading of solids or a paste may be performed effectively within a short period of time.

It is a special object of the present invention to provide a milling device useful for milling plastic materials and fillers.

In accomplishing the foregoing objects, there is provided in accordance with the present invention, a mixing device which comprises a pair of plate means each having a non-flat operating surface and being adapted so that, by movement of one or both, a relative motion between the two operating surfaces may be maintained, and grooves provided in both of said operating surfaces and arranged so that the grooves of one operating surface may cross the grooves of the other operating surface upon the relative motion between the two operating surfaces.

By the crossing of the grooves of both operating surfaces (when viewed in a plane projection) upon the relative motion, generally rotation, the solids between the two operating surfaces may be subjected to shear forces so that the mixing efficiency and milling efficiency are improved. When the grooves of both operating surfaces are arranged so that each crossing point in a plane projection displaces outwardly toward the periphery of the plate means, the mixed product between the two operating surfaces is urged to be discharged therefrom in an accelerated manner.

The advantages accruing from the mixing device of the present invention are as follows:

b 1. Mixing efficiency is extremely higher than the conventional mixers. With the mixing device according to the present invention, a mixing time of 5–30 seconds is sufficient to attain homogeneous mixing. Therefore, it is possible to mix such raw materials that are thermally unstable, such as polyvinyl chlorides, chlorinated polyethylenes or wood powder.

2. Since the mixing device has a high mixing performance and is adapted for mixing at an elevated temperature, the volume ratio of the plastic material to the filler can be decreased to about 30/70 which is proximate to the limit value 26/74.

3. The mixing device is utilizable for decreasing the volume of bulky materials formed of foamed materials, thin films or the like.

4. High mixing performance makes it possible to minimize the area of the operating surfaces. Thus, the mixing device is compact and requires less energy.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIGS. 7(a) through 7(g) are vertical cross-sections schematically illustrating alternate embodiments of the upper and lower discs.

DETAILED DESCRIPTION OF THE PREFERRED EMBODIMENTS OF THE INVENTION

Figure 1:
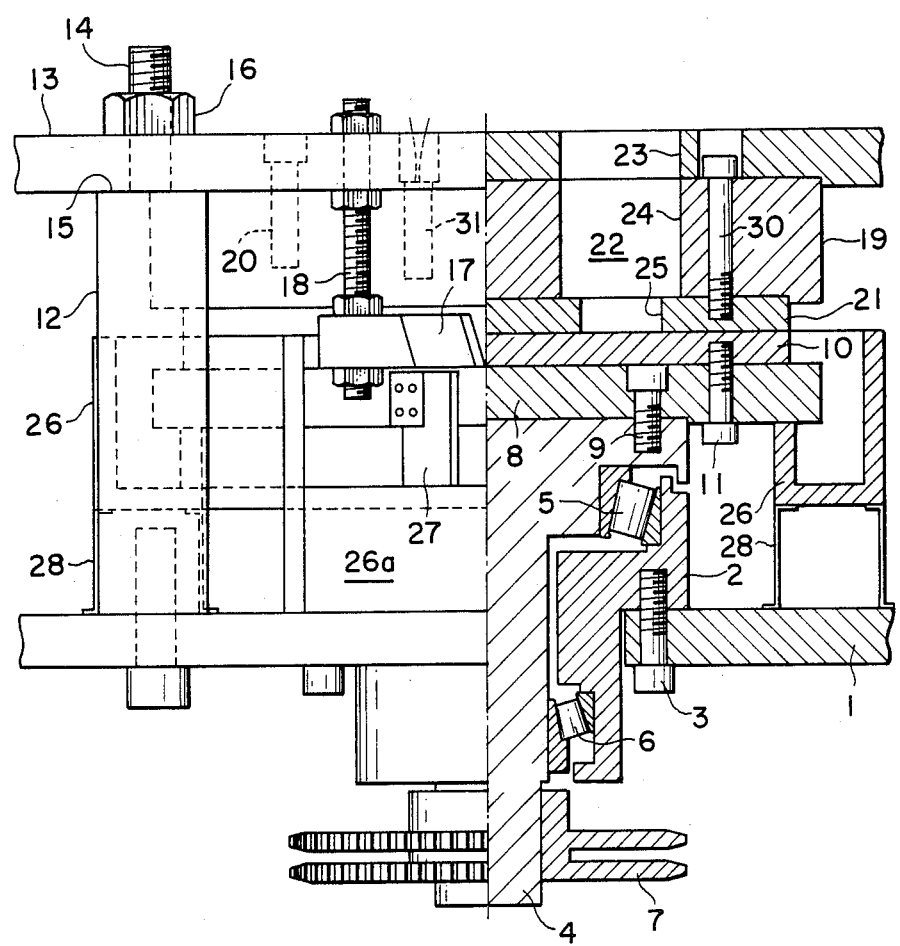
FIG. 1 is an elevational view, partly in cross-section, diagrammatically showing one embodiment of the mixing device according to the present invention.
Figure 2:
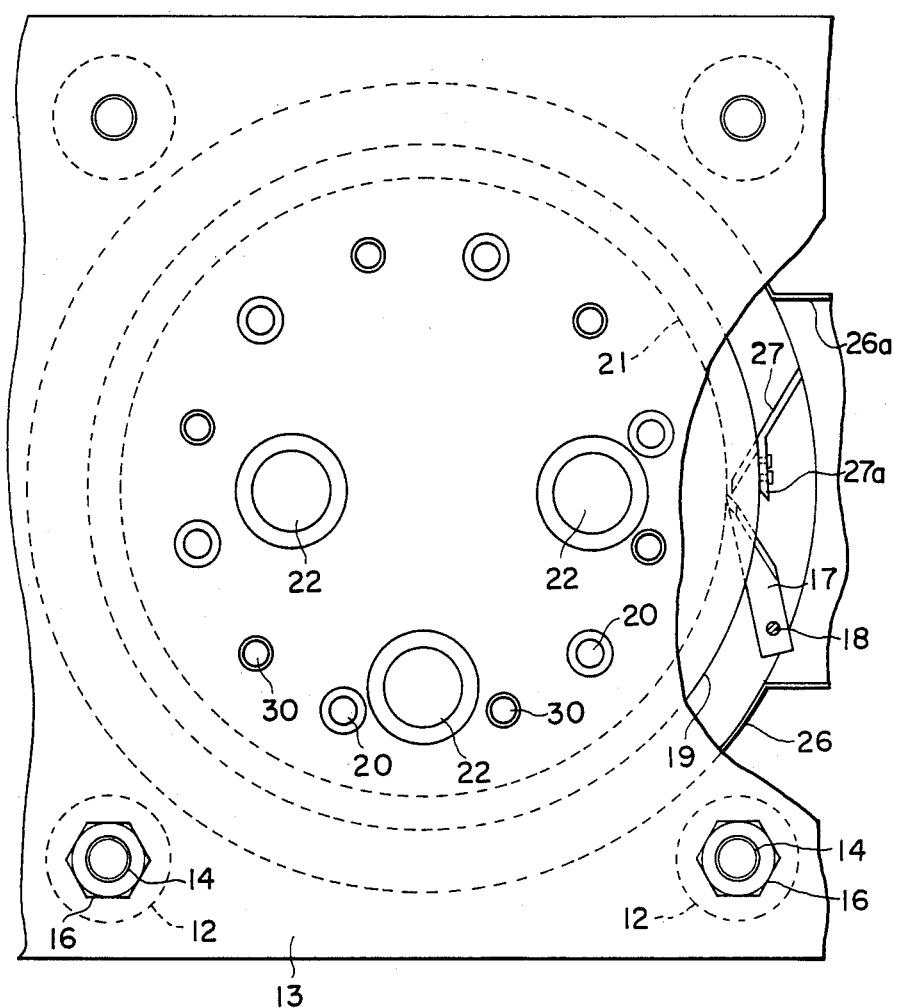
FIG. 2 is a plan view of FIG. 1, cut away in part.

Referring now to the accompanying drawings, first to FIGS. 1 and 2, the reference numeral 1 denotes a lower support frame having a central aperture through which a sleeve member 2 is inserted. The sleeve member 2 is fixed to the lower frame 1 by means of screws 3. An axle 4 is rotatably received by the sleeve member 2 with its axis as the center of rotation. Designated as 5 and 6 are bearings. The axle 4 has its lower end portion fixedly provided with a sprocket 7 which is driven by a chain (not shown) for rotation with the axle 4. The axle 4 has a flange portion at its top to which is fixedly secured a lower supporting plate 8 by means of screws 9. To the supporting plate 8 is fixed a lower operating disc 10 by means of screws 11. Thus, the lower operating disc 10 rotates about the axis of the axle 4 upon actuation of the sprocket and chain drive.

A plurality (four in the specific embodiment shown) of support bars 12 are vertically provided on the lower support frame 1, to the upper portions of which is horizontally secured an upper support frame 13. Thus, each support bar 12 has an upper, smaller diameter portion 14 provided with an external thread. The upper frame 13 is in supporting engagement with the upper surface 15 of the stepped portion of each support bar and is secured thereto by nuts 16.

Firmly fixed to the upper frame 13 by means of screws 20 is an upper supporting plate 19 to which is fixedly secured an upper operating disc 21 by means of screws 30. The upper and lower operating discs 21 and 10 are disposed face to face with a predetermined space therebetween. The distance between the both discs 21 and 10 which can be varied by providing a spacer (not shown) between the stepped portion 15 of each of the vertical support bars 12 and the upper frame 13, is maintained at a predetermined value throughout the mixing operation. The space between the two opposing discs 10 and 21 serves as a mixing zone where mixing of feed materials is effected.

The upper frame 13, the upper supporting plate 19 and the upper disc 21 have openings 23, 24 and 25, respectively, by which a feed port 22 for feeding the feed stock to be mixed is defined. Thus, the feed port 22 is in fluid communication with the mixing zone. Two or more feed ports with the above construction may be provided, if desired. The feed port 22 can serve also as an exhaust port from which gases trapped in the feed stock and steam generated during the mixing operation may be advantageously withdrawn. If necessary, an air cylinder, screw conveyor or any other means can be disposed in each feed port 22 for acceleration of the feed of the feed stock to the mixing zone. The feed stock introduced into the mixing zone is subjected to mixing operation effected by rotation of the lower disc 10 and the mixed product is discharged from the outer periphery of the two discs 10 and 21.

Scraping means is suitably provided for collecting the mixed product at a predetermined location. The scraping means in this embodiment includes a blade member 17 mounted on a supporting rod 18 which is secured to the upper frame 13. The blade member is disposed so that one edge thereof is maintained in contact with the outer peripheral surfaces of the operating discs 10 and 21. Provided beneath the periphery of the discs 10 and 21, which have, in this embodiment, the same diameter, is an annular recovery vessel 26 having a U-shaped cross-section and being disposed in position by means of a support 28 mounted on the lower frame 1. Thus, the mixed product discharged from the outer peripheral portion of the discs 10 and 21 is successively scraped by the blade member 17 and is collected in the annular vessel 26. A discharge port 26a is provided in the vessel 26 at a position adjacent to the blade member 17 for recovering the mixed product therefrom. To facilitate the discharge of the mixed product from the annular vessel 26, the bottom of the vessel 26 at the discharge port 26a may be slanted downwardly in the radial outward direction.

Figure 3:
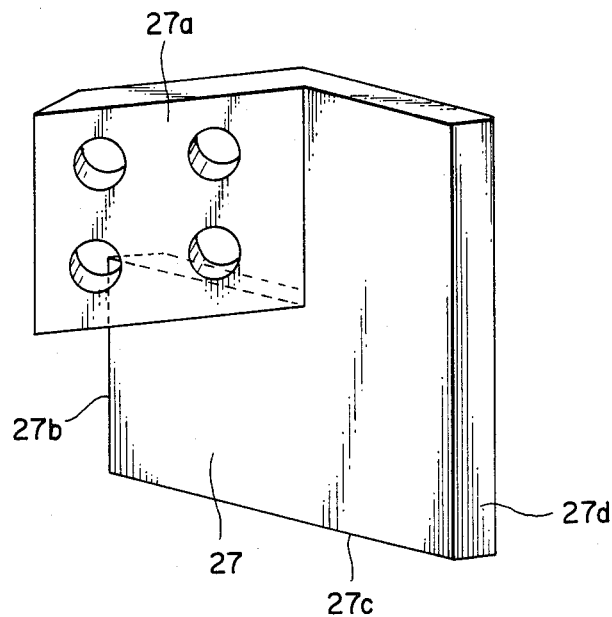
FIG. 3 is a perspective view diagrammatically showing the collecting plate of FIGS. 1 and 2.

Although most of the mixed product can be recovered by the scraping blade 17, some of the mixed product can fall from the peripheral portion of the discs 10 and 21 without assistance of the scraping blade 17. In the preferred embodiment of the present invention, such a mixed product is collected by a collecting plate 27 which is mounted on the outer periphery of the lower supporting plate 8 for rotation therewith. As illustrated in FIG. 3, the collecting plate 27 has a cut-and-bent portion 27a having through holes through which screws are inserted for mounting of the collecting plate 27 on the lower supporting plate 8. The collecting plate 27 has its opposite edges 27b and 27d maintained in slidable contact with the opposite inner side walls of the U-shaped annular vessel 26 and a lower edge 27c in slidable contact with the bottom of the vessel 26. As a consequence of the above construction, the mixed product within the collecting vessel 26 is gathered by the collecting plate 27 as it rotates along the annular vessel 26. If desired, two or more such collecting plates may be mounted to the lower supporting plate 8. Further, in place of the collecting plate 27, means for vibrating the collecting vessel 26 may be provided for facilitating the discharge of the product from the discharge port 26a. In this case, it is preferred that the collecting vessel 26 be maintained in a slanted position, preferably by an angle of 3°-20° from the horizontal plane, such that the discharge port 26a is located at the lowermost level. The discharge port 26a can be connected to a feed port of an injection molding machine, an extruder or the like. If desired, a cooling means such as a water jacket may be provided in the collecting vessel 26 to prevent the deposition of the molten mixed product on the surfaces of respective parts. Designated as 31 in FIG. 1 is a heater for indirectly heating the raw materials in the feed port 22 and in the mixing zone defined between the two operating discs 10 and 21.

Figure 4:
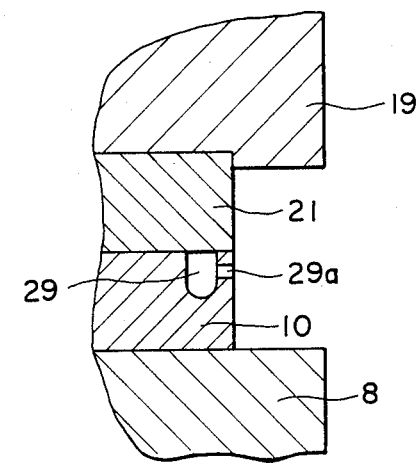
FIG. 4 is a fragmentary, vertical cross-section showing an alternate embodiment of the discharge port.

In an alternative embodiment, the recovery of the mixed product is performed in the manner as illustrated in FIG. 4. The lower operating disc 10 has, in this embodiment, an annular groove 29 near its periphery for receiving the mixed product therein. One or more through holes 29a are provided at the outer periphery of the disc 10 through which the mixed product in the groove is discharged for recovery.

Figure 5A:
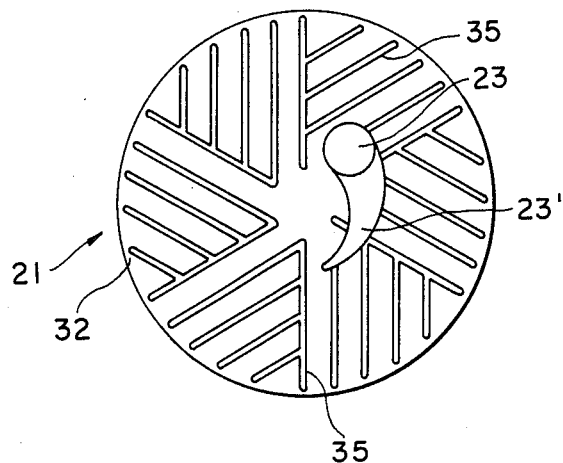
FIGS. 5(a) and 5(b) are plan views diagrammatically showing the operating surfaces of the upper and lower discs, respectively.
Figure 5B:
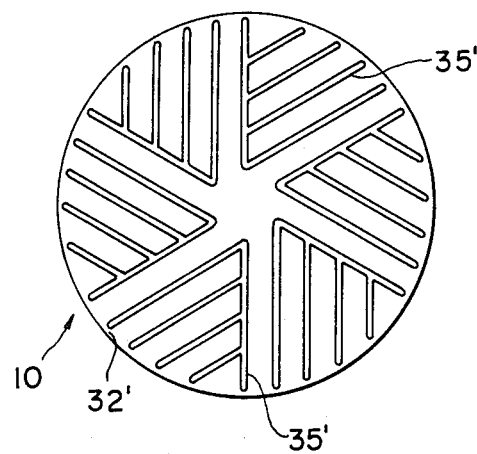

FIGS. 5(a) and 5(b) illustrate the operating surfaces of the upper and lower discs 21 and 10, respectively. The upper disc 21 has a multiplicity of grooves 35 on its operating surface. In the particular embodiment shown, the surface of the disc 21 is angularly equally divided by six grooves radially outwardly extending from the center of the disc 21 into six segments or sectors. Each segment has a plurality of grooves arranged in parallel with the radial groove. The grooves are formed such that the grooves in one segment are not parallel with the grooves in its adjacent segments. The lower disc 10 is provided with the similar grooves 35' as shown in FIG. 5(b). The segments from which each disc is constituted may be constructed in such a way as to be disassembled from each other. Such a construction is economically advantageous because when the disc is broken, it suffices that the broken segment or segments alone be replaced with new segment or segments. As shown in FIGS. 5(a) and 5(b), all the grooves 35 and 35' are terminated before the peripheral edge, thereby forming a flat, annular portion 32 and 32' at the periphery. The flat portion serves as a dam to retard the flow of the mixed product.

The upper and lower disc 21 and 10 thus constructed are mounted on the upper and lower supporting plate 19 and 8 (FIG. 1), respectively, with their operating surfaces covered with the grooves being faced and, generally, in parallel with each other and with a predetermined aperture of, preferably, 0.2-2 mm. In FIG. 5(a), the reference numeral 23' is an arched, concave portion formed on the operating surface of the disc 21. The concave portion 23' is in fluid communication with the feed port 22 and becomes gradually shallow and thin to facilitate the flow of the feed materials from the feed port 22 to the mixing zone defined between the two operating surfaces.

The feed materials are mixed in the mixing zone. Upon rotation of the axle 4, a relative motion is maintained between the two operating surfaces. Since the grooves of the upper disc 21 cut the grooves of the lower disc 10, when viewed in the plane projection, the feed materials fed between the two operating surfaces are milled and mixed with each other in a facilitated manner because of the shear forces exerted thereon.

Whilst it is convenient to maintain the upper disc 21 stationary and rotate the lower disc 10, the opposite arrangement may be used if desired. The relative motion between the two operating surfaces can be of course maintained by rotation of the two discs 21 and 10.

Alternative embodiments of the groove arrangement are shown in FIGS. 6(a)-6(f). The pattern or profile of the grooves as shown in FIGS. 5(a) and 5(b) is especially preferred because of good mixing performance, however. In FIGS. 6(a)-6(f), only the upper disc is shown and the illustration of the concave portion 23' and opening 23 is omitted. Similar component parts are designated by the same reference numerals in the drawings.

Figure 6A:
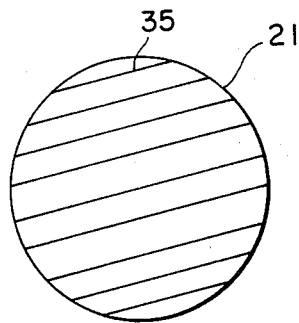
FIGS. 6(a) through 6(f) are plan views schematically illustrating alternate embodiments of operating surfaces.
Figure 6B:
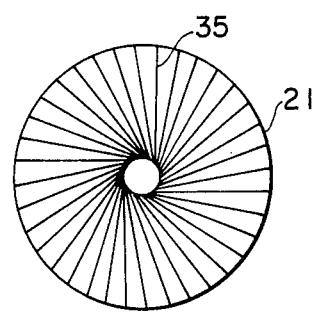
Figure 6C:
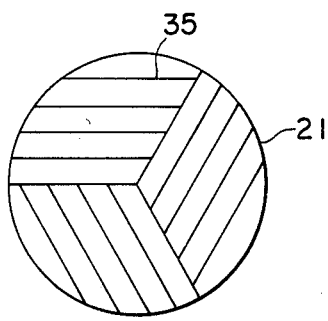
Figure 6D:
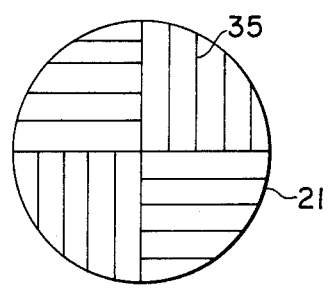
Figure 6E:
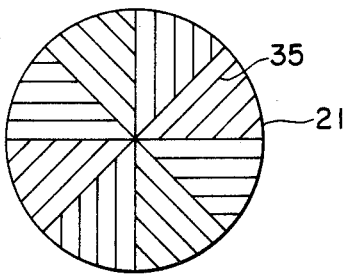
Figure 6F:
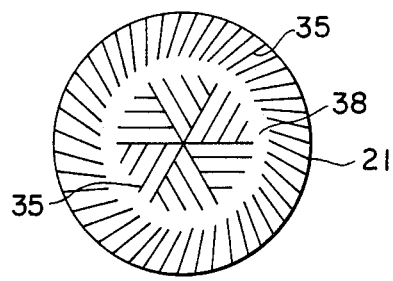

The grooves 35 of the disc 21 of FIG. 6(a) are arranged in uni-direction. In FIG. 6(b), the grooves are arranged approximately radially. This arrangement is suited for rapid flow of the feed materials. The patterns of FIGS. 6(c)-(e) are variants of FIG. 5(a) and are the same as the pattern of FIG. 5(a) except that the patterns of FIGS. 6(c) through 6(e) have three, four and eight segments, respectively. The pattern shown in FIG. 6(f) is a combination of the patterns of FIG. 5(a) and FIG. 6(b). The disc 21 of FIG. 6(f) has its central portion provided with such grooves as shown in FIG. 5(a), a flat annular portion 38 and an annular peripheral portion provided with the grooves as shown in FIG. 6(b). The flat portion 38 serves as a stop or a dam to retard the flow of raw materials to be mixed through the mixing zone. As a result, a plastic material which has a high melting point and is difficult to mill can be effectively milled. The mixing is effected mainly in the central region of the operating surface inside of the dam 38, while the main function of the outer peripheral region outside of the flat portion 38 is to accelerate the discharge of the mixed product. That is, the retardation of the flow resulting from the dam portion 38 may be compensated by the radial orientation of the grooves at the periphery portion. The flat portion 38 is preferably provided both or either one of the upper and lower discs 21 and 10. It is preferred that the both discs 21 and 10 have such flow stops 38 in such positions that they face with each other when mounted in position.

The operation surfaces of FIG. 6(a) through 6(c) can be provided with a flat portion or dam in the same manner as shown in FIGS. 5(b). The patterns of the grooves 35 are not limited to the above embodiments and can be any patterns such as circinate patterns, so long as the grooves of the disc 21 can cut the grooves of the lower disc 10 during their relative rotation.

Although it is preferred that, as shown in the above embodiments, the upper and lower plate member 21 and 10 have a circular shape of the same diameter, they can be formed into discs of different diameters or into any polygonal shapes such as trigonal, tetragonal hexagonal and decagonal shapes, if desired. It is not necessary that the upper and the lower plates have the same shape. For example, combinations of hexagonal and octagonal plates and polygonal plate and a circular disc plate may be adapted. The thickness of the plate member 21 and 10 is not specifically limited.

The cross-section of the grooves of the operating plate 10 and 21 can be V-shaped, curved (e.g. semicircular), trapezoidal (e.g. wedge-shaped) or any suitable combination thereof. The depth and the width of the groove and the distance between the two adjacent grooves may vary according to the kind and thickness of the raw material to be mixed. Preferably, the depth is between 0.5 and 5 mm, the width is between 1 and 10 mm and the distance between two adjacent grooves is between 0.1 and 10 times, more preferably between 0.5 and 4 times the width of the groove. The operating surfaces of the discs 21 and 10 are suitably formed of iron or steel. If necessary, the operating surfaces may be covered with a non-abrasive material such as a ceramic or a wear resistant alloy.

The operating surfaces of the discs 21 and 10 are generally disposed in parallel with each other. However, if desired, the distance between the two operating surfaces at a peripheral portion can be made smaller than that at central portion.

In all the above combinations, the operation surfaces of the discs 10 and 21 are substantially flat when the roughness resulting from the grooves is not taken into consideration. However, both discs 10 and 21 can have waved, curved or creased surfaces which are in engagement with each other in such a way as to permit the relative motion (rotation) therebetween, as illustrated in FIGS. 7(a)-7(g). In such a non-flat structure, the surface area of each disc becomes greater than that of the flat disc of the same diameter, whereby the improvement in mixing efficiency may result. Further, the flow rate of the feed materials through the mixing zone can be controlled by the shape of the non-flat surface. In FIGS. 7(a)-7(g), the illustration of the grooves is omitted.

The mixing device according to the present invention is suitably used for the milling of waste plastic material and an organic or inorganic filler. The plastic material may be a thermoplastic resin such as a polyethylene, a polypropylene, a polyvinyl chloride, a polystyrene, a polyester, an acrylonitrile-butadiene-styrene resin or a polyamide, or a thermosetting resin such as an epoxy resin, a polyester, a urea resin, a phenol resin or a silicone resin. The plastic material is fed to the feed port of the mixing device in the form of powder or granules having a diameter of between about 0.1 and 10 mm. By constructing the mixing device in a large device with a feed means being provided in its large feed port, it is possible to treat a gross plastic material such as a foamed material, a container, a film or a sheet. An example of the organic filler is wood powder. Examples of inorganic fillers include a sludge (ash from heavy petroleum oil), a slug, stone powder, talc, silica, carbon black, finely divided glass, etc. The above organic and inorganic fillers may be used in combination of two or more. If necessary, a coloring agent, a stabilizer or the like additives may be incorporated into the feed materials.

The feed materials may be fed to the feed port 22 after being premixed with each other. However, it is convenient that they are introduced separately into the mixing device from separate feed ports. In this case, it is preferred that the plastic material be fed from the feed port located near the center of the rotation and the filler be introduced from the feed port located more remote from the center for reason of easy attainment of homogeneous mixing between them. The feed materials are then milled in the mixing zone while being heated by the heater 31. The feed materials are heated to a temperature higher by 10°-150° C. than the melting point of the plastic material by the heat from the heater and the heat generated by friction. The milled or mixed product is discharged from the discharge port 26a and is passed to the succeeding zone such as an extruder while being maintained in the molten state. If the mixing device is used for mixing of solids or for grinding of solids, it is not necessary to use the heater 31.

The following examples will further illustrate the present invention.

EXAMPLE 1

Polypropylene pellets having a grain size of about 5 mm were milled with the device as shown in FIG. 1 whose operating discs 21 and 10 had a diameter of 250 mm and a thickness of 20 mm. The diameter of the inlet port 22 was 30 mm. The device had an output power of 2.2 KW. The rotational speed of the disc 10 was 30 r.p.m. The grooves 31 and 31' had a semi-circular in cross section and are arranged in the manner as indicated in Table 1. The pattern of the grooves of the upper and lower discs 21 and 10, the size and the number of the grooves 31 and 31', the load of the motor for actuation of the disc 10, the heating temperature by a heater 31, the temperature of the milled product as discharged from the port 26a and the recovery rate of the milled product were as summarized in Table 1.

cur. With the mixer used in Test 11, it was impossible to optionally select the mixing ratio of the filler to the plastic. With the mill used in Tests 12 and 14, milling of a plastic in the form of a pellet required a high load. In Test 13, there was observed slight carbonization of the wood powder.

TABLE 2

| Test No. | Mill | Operation | Rotation speed (r.p.m.) | Milling time | State of milled product* |
|---|---|---|---|---|---|
| 9 | Present invention | Continuous | 15–40 | 5–30 sec. | A |
| 10** | Kneader | Batch | 34–60 | 30–60 min. | D |
| 11** | Henschel mixer | Batch | 700–2800 | 10–40 min. | C |
| 12** | Unidirectional, biaxial rotary mill | Continuous | −150 | 2–5 min. | B |
| 13** | Hetero-directional, biaxial rotary mill | Continuous | 300–500 | 2–5 min. | C |
| 14** | Hetero-directional, biaxial rotary mill with vacuum bent | Continuous | 16–50 | 4–10 min. | B |

*Evaluation was rated as follows
A: Excellent
B: good
C: bad
D: very bad
**Comparative example

EXAMPLE 3

Polyethylene powder and wood powder (b 80 mesh) were milled in the same manner as in Test 9 of Example 2, except that the upper and lower operating discs 21 and 10 had a non-flat, waved surface. The cross-section of the discs was similar to that illustrated in FIG. 7(a). The wavelength $l_1$ (See FIG. 7(a)) was 40 mm and the wave height $l_2$ was 12 mm. The radius of the curvature of the top or bottom of the wave was 9 mm. The arrangement of the grooves, when viewed in plan projection, was as shown in FIGS. 5(a) and 5(b). As a result of the milling operation, a very well milled product similar to that obtained in Test 9 was obtained at a higher rate than that in Test 9.

TABLE 1

| | Upper disc 21 | | | Lower disc 10 | | | | | | |
|---|---|---|---|---|---|---|---|---|---|---|
| Test No. | Arrangement of grooves | Radius of each groove (mm) | Number of grooves | Arrangement of grooves | Radius of grooves (mm) | Number of grooves | Load of motor (A) | Heating temperature of Heater 31 (°C.) | Temperature of Product (°C.) | Recovery Rate of Product (Kg/H) |
| 1 | FIG. 6(b) | 1.5 | 36 | FIG. 5(b) | 2 | 5* | 7.5 | 230 | 220 | 2.7 |
| 2 | FIG. 6(e) | 1.5 | 7* | FIG. 6(e) | 1.5 | 7* | 8.5 | 230 | 210 | 6.3 |
| 3 | FIG. 5(a) | 1.5 | 5* | FIG. 5(b) | 1.5 | 5* | 6.6 | 225 | 220 | 3.1 |
| 4 | FIG. 5(a) | 2 | 5* | FIG. 5(b) | 2 | 5* | 7.0 | 228 | 215 | 4.9 |
| 5 | FIG. 5(a) | 1.5 | 10* | FIG. 5(b) | 1.5 | 10* | 7.0**** | 210 | 200 | 8.3 |
| 6 | FIG. 5(a) | 2 | 10* | FIG. 5(b) | 2 | 10* | 7.7 | 250 | 230 | 12.8 |
| 7** | No grooves | — | — | No grooves | — | — | — | 200 | — | *** |
| 8** | No grooves | — | — | FIG. 5(b) | 2 | 5* | — | 255 | — | *** |

*Per one segment
**Comparative example
***No milling was effected
****Rotational speed of disc: 25 r.p.m.

EXAMPLE 2

Polyethylene powder and wood powder (80 mesh) were continuously milled using the device used in Test 6 of Example 1 with various rotational speeds of the disc 10 of in the range of 15 to 40 r.p.m. (Test 9). Very well milled products in the form of a melt were obtained in the milling time of 5 to 30 seconds. For the purpose of comparison, similar tests (Tests 10–14) were performed using known milling machines. The results were as shown in Table 2. In Test 10, the carbonization and decomposition of the wood powder were found to oc-

EXAMPLE 4

Using the milling device of Test 6 of Example 1, several combinations of plastic materials and fillers as shown in Table 3 were milled under the conditions shown in Table 3. For the purpose of comparison, the similar tests were performed using the mill as used in Test 12 of Example 2. The milling conditions and the results are summarized in Table 3. It will be appreciated from the results shown in Table 3 that, with the milling device according to the present invention, milling of the plastic and filler may be conducted effectively with a shorter period of time and with a lower energy consumption even when the filler is used in a large amount, as compared with the conventional milling machines.

TABLE 3

| Test No. | Plastic material (pellet) | Filler (powder) | Filler to plastic mixing ratio | Power (KW) | Rotational speed (r.p.m.) | Heating temp. of Heater (°C.) | Temp. of product (°C.) | Milling time | Recovery rate of product (Kg/H) | State of milled product** |
|---|---|---|---|---|---|---|---|---|---|---|
| 15 | Regenerated polypropylene | Stone | 3 | 2.2 | 25 | 250 | 230 | 15 sec. | 14 | A |
| 16 | Regenerated polypropylene | Stone | 3 | 2.2 | 35 | 250 | 220 | 10 sec. | 18 | A |
| 17 | Polyethylene | Wood | 2 | 2.2 | 30 | 225 | 210 | 10 sec. | 15 | A |
| 18 | Polypropylene | Iron oxide | 7.3 | 2.2 | 30 | 225 | 205 | 15 sec. | 25 | A |
| 19* | Polyethylene | Wood | 1 | 5.5 | 74 | 190 | 185 | about 2 min. | 18 | A |
| 20* | Polyethylene | Wood | 2 | 5.5 | 74 | 210 | 200 | about 2 min. | 20 | B |
| 21* | Polypropylene | Iron oxide | 7.3 | 5.5 | 74 | 200 | — | — | — | D |

*Comparative Example
**Evaluation ratings are the same as that in Example 2

EXAMPLE 5

Polypropylene and calcium carbonate were milled using the milling device of the present invention having operating discs with non-flat operating surfaces. Thus, Tests 22 and 23 were carried out with operating discs as used in Example 3. The discs used in Tests 24 and 25 had the same groove arrangement as that of Example 3 but had a cross-section as shown in FIG. 7(d). The disc had a diameter of 250 mm with its central flat portion having a diameter of 110 mm. The outer annular portion was slanted by an angle of 22° from the horizontal plane. The mill was operated at a rotational speed of the disc of 25 r.p.m. with a power of 2.2 KW under the conditions shown in Table 4. Each product was found to be well milled.

The invention may be embodied in other specific forms without departing from the spirit or essential characteristics thereof. The present embodiments are threfore to be considered in all respects as illustrative and not restrictive, the scope of the invention being indicated by the appended claims rather than by the foregoing description, and all the changes which come within the meaning and range of equivalency of the claims are therefore intended to be embrased therein.

TABLE 4

| Test No. | Shape of operating surface | Mixing ratio Filler/Plastic | Heating temperature of Heater (°C.) | Temperature of milled product (°C.) | Milling time (sec.) | Recovery rate of product (Kg/H) |
|---|---|---|---|---|---|---|
| 22 | Waved | 1 | 260 | 240 | 15-20 | 21 |
| 23 | Waved | 2 | 280 | 260 | 15-20 | 16 |
| 24 | Creased | 1 | 250 | 240 | 10-15 | 20 |
| 24 | Creased | 2 | 260 | 245 | 10-15 | 12 |

We claim:

1. A mixing device comprising:
   a pair of plate means coaxially aligned and spaced apart from each other to define therebetween a mixing zone, each plate means having a non-flat operating surface facing the other operating surface and being adapted so that, by movement of one or both plate means, a relative motion between the two operating surfaces may be maintained;
   grooves provided in both of said operating surfaces and arranged so that the grooves of one operating surface may cross the grooves of the other operting surface upon the relative motion between the two operating surfaces; and
   removal means adapted to contact said plate means to remove the mixed product discharged from said mixing zone.

2. A mixing device as claimed in claim 1, further comprising an annular groove provided on the peripheral portion of one of said plate means, a closure means provided in the periphery of said mixing zone so that the mixed product in said mixing zone is collected within said annular groove, and a discharge port provided in said plate means in fluid communication with said annular groove so that the mixed product may be discharged through said discharge port.

3. A mixing device as claimed in claim 1, wherein the grooves on the operating surface of each of said plate means includes a plurality of angularly equally spaced grooves radially extending on the operating surface to divide said surface into a plurality of sectors, and a plurality of grooves arranged in each sector parallel with the radial groove of each sector.

4. A mixing device as claimed in claim 3, wherein each operating surface has six equiangularly spaced radial grooves to divide said surface into six sectors.

5. A mixing device as claimed in claim 1, wherein one of said plates is mounted on a support plate on which a heater means is mounted so that the feed materials in said mixing zone may be heated to a desired temperature.

6. A mixing device as claimed in claim 1, wherein said removal means includes a stationary blade disposed to contact the peripheral surfaces of said plate means.

7. A device for continuously mixing feed materials to obtain a mixed product, comprising:
   a pair of coaxially aligned, spaced apart upper and lower discs which define a mixing zone therebetween, each of which has an operating surface, which are disposed so that their operating surfaces face each other and which are adapted so that, by rotation of one or both, a relative motion between the two operating surfaces may be maintained;

grooves provided in both of said operating surfaces and arranged so that the grooves of one operating surface may cross the grooves of the other operating surface upon the relative motion between the two operating surfaces;

means for causing the relative motion between the both operating surfaces by rotation of one or both of said upper and lower discs;

one or more inlet ports provided in the upper disc and each in fluid communication with said mixing zone for introducing the feed materials to be mixed therethrough into said mixing zone;

a stationary blade member disposed in direct contact with the outer peripheral surfaces of said upper and lower discs such that the mixed product discharged from the periphery of said mixing zone is scraped by said blade member; and an annular collecting vessel disposed adjacent to the periphery of said mixing zone for receiving the mixed product discharged from said mixing zone.

8. A device as claimed in claim 7, wherein the grooves on the operating surface of each of said upper and lower disc include a plurality of angularly equally spaced grooves radially extending on the operating surface to divide same into a plurality of sectors, and a plurality of grooves arranged in each sector parallel with the radial groove of each sector.

9. A device as claimed in claim 8, wherein each operating surface has six equiangularly spaced radial grooves to divide said surface into six sectors.

10. A device as claimed in claim 8, wherein the sectors from which each disc is constituted are constructed to be disassembled from each other.

11. A device as claimed in claim 7, wherein said upper disc is mounted on a support plate on which a heater means is mounted so that the feed materials in said mixing zone may be heated to a desired temperature.

12. A device as claimed in claim 7, further comprising mixed product removal means disposed for movement within said annular collecting vessel to remove the mixed product from said collecting vessel.

* * * * *